No. 617,460. Patented Jan. 10, 1899.
W. R. CLAY & B. WALMSLEY.
SUPPORT FOR INCANDESCENT GAS BURNERS.
(Application filed Sept. 8, 1897.)
(No Model.) 3 Sheets—Sheet 1.
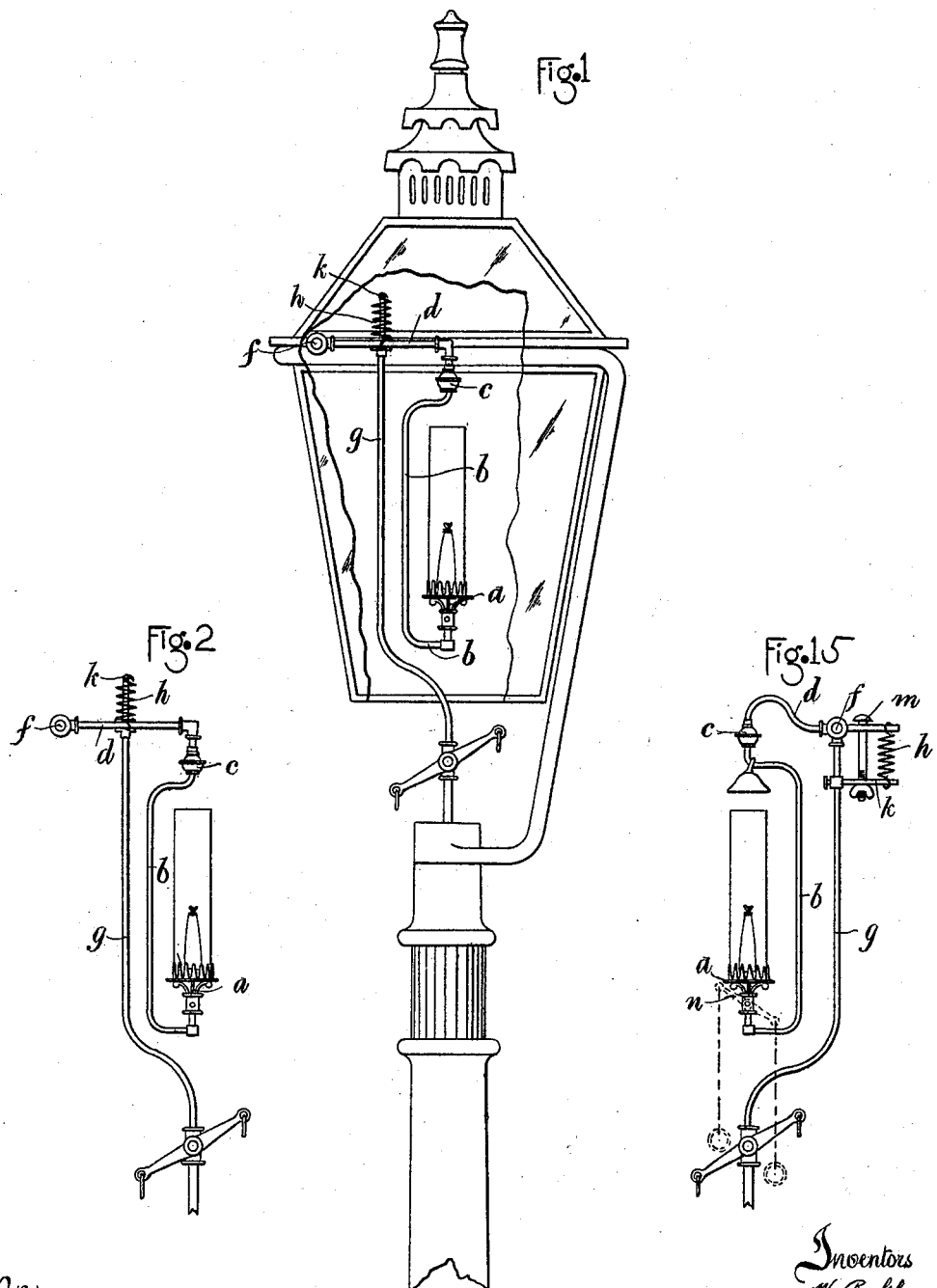

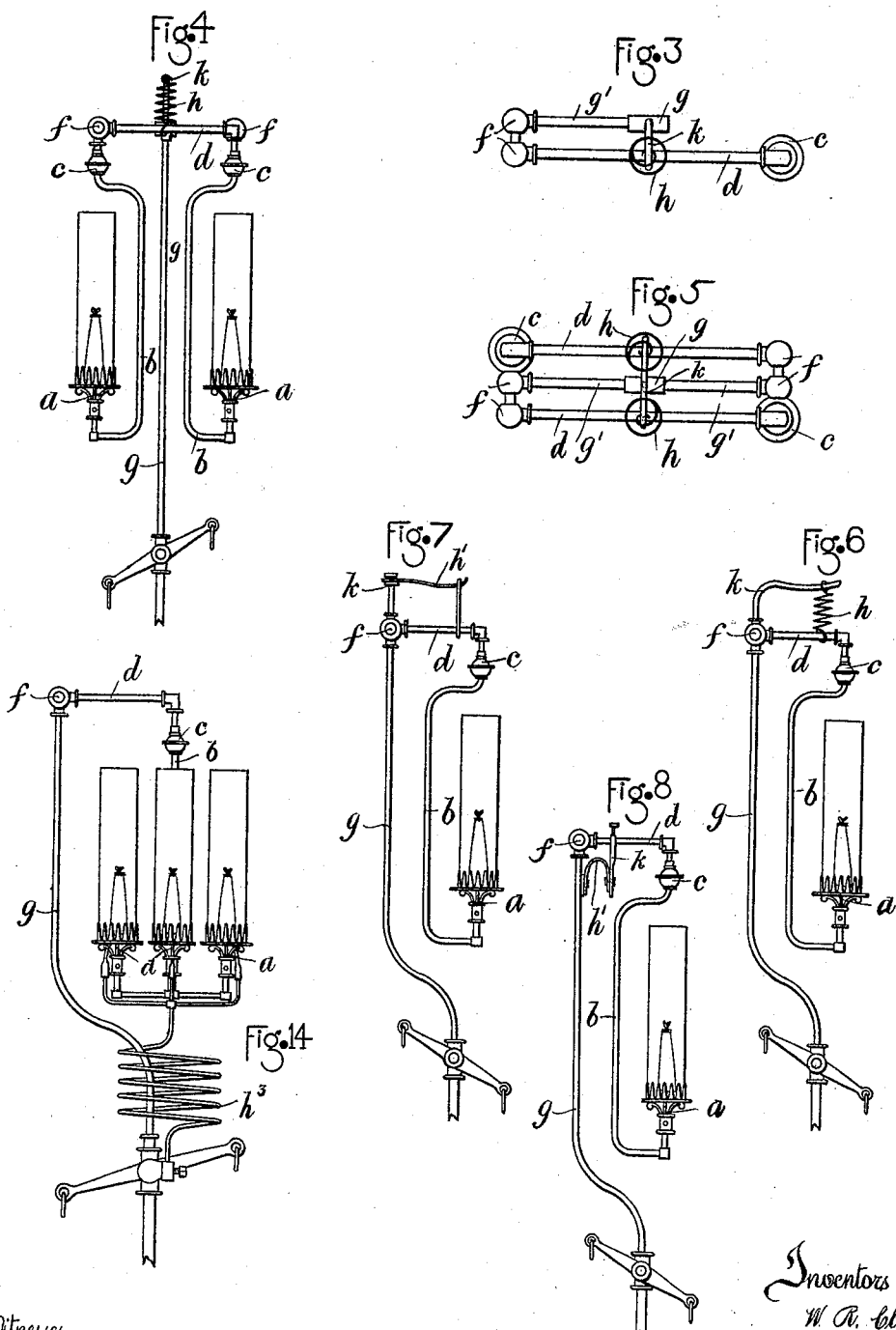

No. 617,460. Patented Jan. 10, 1899.
W. R. CLAY & B. WALMSLEY.
SUPPORT FOR INCANDESCENT GAS BURNERS.
(Application filed Sept. 8, 1897.)
(No Model.) 3 Sheets—Sheet 3.
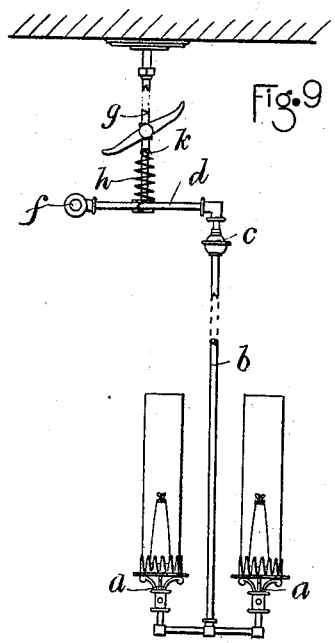
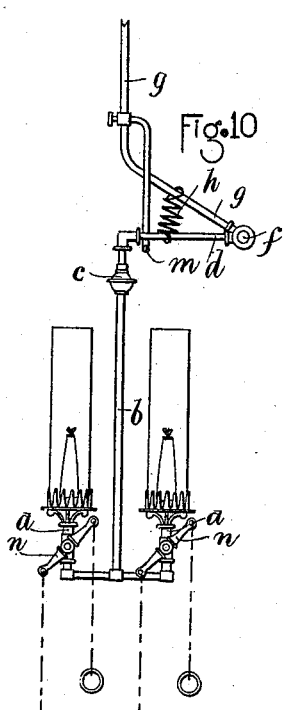
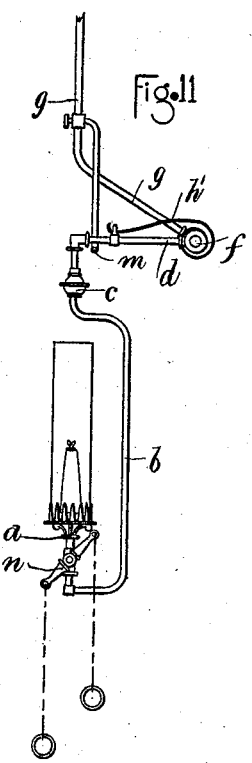
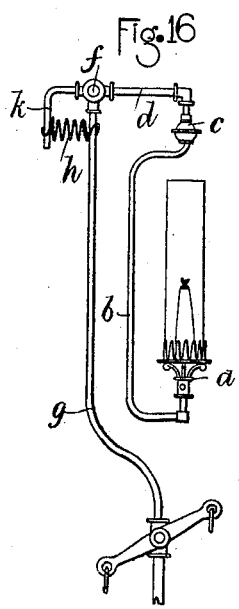
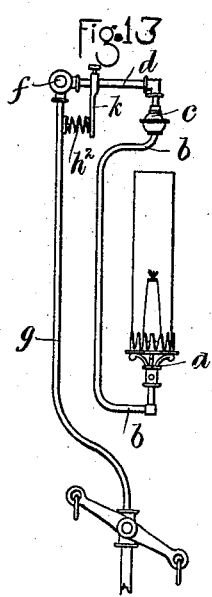
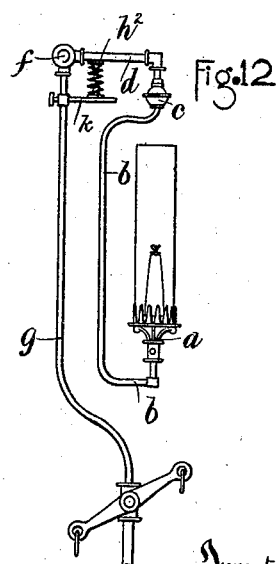

UNITED STATES PATENT OFFICE.

WILLIAM RICHARD CLAY AND BEN WALMSLEY, OF BOLTON, ENGLAND.

SUPPORT FOR INCANDESCENT GAS-BURNERS.

SPECIFICATION forming part of Letters Patent No. 617,460, dated January 10, 1899.

Application filed September 8, 1897. Serial No. 650,905. (No model.)

*To all whom it may concern:*

Be it known that we, WILLIAM RICHARD CLAY and BEN WALMSLEY, subjects of the Queen of Great Britain, residing at Bolton, in the county of Lancaster, England, have invented an Improved Support for Incandescent Gas-Burners, of which the following is a specification.

As is well known, the bearings or supports of the usual type employed in connection with burners for ordinary gas-lighting are rigid and unyielding, so that any jerky vibrations or shocks and jars to which they are or may be subjected—such as those caused in the case of a gas-lamp for street-lighting by the vibrations of the ground due to a passing vehicle, or in the case of workshops, mills, warehouses, and the like by the movements of machinery, removal of goods, and other causes—are very damaging to the mantles or incandescent bodies when the said common burners are displaced by those for this class of lighting. To prevent or counteract this damaging effect, various methods of mounting the incandescent mantles or their burners have been employed, such as securing a portion of the burner and its mantle on springs, or mounting the whole burner, as well as the mantle, on resilient bearings with a flexible (india-rubber or like) pipe for supplying the gas thereto, or, again, by making the gas-supply pipe act as the resilient bearings or support for the burner. However, as there are many defects attending the use of these several devices it is to produce means that shall be of a substantial and thoroughly reliable nature that forms the object of this invention, and this object we obtain by the employment of rigid supply-pipes jointed together to form levers in such a manner as to allow the burner they carry to move freely in any direction while they are retained in position by springs arranged relatively with their several fulcrums, so that the inertia of the burner acts in one direction and the force of the spring in the opposite direction, as is hereinafter explained by reference to the accompanying sheets of drawings, in which—

Figure 1 is a part sectional elevation of a street-lamp having an incandescent burner mounted therein by the supply-pipes constructed in accordance with our invention. Fig. 2 is an elevation of a burner and our improved construction of supply-pipe exactly the same as those shown by Fig. 1; but the lamp and other parts are now omitted. Fig. 3 is a view of the parts shown by Fig. 2 as seen from above and drawn to an enlarged scale. Fig. 4 is a similar view to Fig. 2, but illustrates an arrangement of our improved parts when two burners are mounted together. Fig. 5 is a view of parts shown by Fig. 4 as seen from above and drawn to an enlarged scale. Fig. 6 is a similar view to Fig. 2, but shows a different form of holder for the supporting-spring. Figs. 7 and 8 are also similar views to Fig. 2, but show two arrangements whereby flat instead of closed spiral springs may be employed. Figs. 9, 10, and 11 are illustrative of arrangements whereby our improved means may be used when the gas-supply pipe is situated above the burners. Figs. 12 and 13 are similar views to Figs. 6 and 8, but illustrate open spiral springs instead of a closed spiral and a flat spring, respectively. Fig. 14 is an elevation illustrating an arrangement whereby the gas for the main lights of the burners is supplied through our improved jointed pipes, while the gas for the pilot or by-pass lights passes through a coiled supply-pipe, forming the resilient bearing for the whole. Figs. 15 and 16 are elevations illustrating jointed supply-pipes arranged in less desirable positions, (although to a certain degree effective) than are those illustrated by the other figures.

Similar letters of reference indicate similar parts throughout the several views.

The burner $a$, carrying its usual incandescent mantle, is mounted upon the supply-pipe $b$, pivoted by a ball-and-socket joint at $c$ to the horizontally-disposed pipe $d$, this pivoting of said pipe $b$ enabling same to freely move in any lateral direction that the forces acting upon it may cause, so that by gravity it is always brought, when otherwise free, into a vertical position.

The pipe $d$ is pivoted at $f$ by an appropriately-formed joint secured to a horizontal member $g'$ of the main supply-pipe $g$, while a spring $h$ supports said pipe $d$, the pipe $b$, and the burner $a$ at a point between the fulcrum $f$ and the joint $c$ by being attached to a projection $k$, secured to the pipe $g$, by which means and arrangement any vertical motion of this pipe $g$ is transmitted through the joint $f$ to the pipe $d$ and the parts it supports, while by the spring $h$, intervening between said fulcrum $f$ and the burner $a$, all these movements are intercepted by it, and on account of the inertia of the said burner $a$ the said movements are almost entirely centered in said spring $h$, and so said burner and its fragile mantle are protected against their damaging effects. A simple arrangement of these parts is shown by Figs. 1, 2, and 3, while Figs. 4 and 5 are illustrative of a duplication of the parts.

Figs. 6, 7, and 8 show yet other simple arrangements, the two latter having flat springs $h'$ instead of spiral springs $h$. Again, Figs. 9, 10, and 11 illustrate the parts as secured to or used in connection with a supply-pipe situated above the burner $a$, while a flat spring $h'$, Fig. 11, may also be used, and, if desired, stop-pieces $m$ may be arranged to prevent the parts from being pulled or forced too far out of position by the turning of the taps $n$, which in these several arrangements are shown as being mounted on the burners $a$.

In Figs. 12 and 13 arrangements are shown whereby open spiral springs $h^2$ may be used, their resilience acting, as is well known, in an opposite direction to the resilience of the closed springs in the other views.

Fig. 14 illustrates an arrangement of the parts above described whereby the supporting-spring $h^3$ may be placed beneath the burners $a$, and such spring $h^3$ may form the supply-pipe for the by-pass or pilot lights in the burners, while the main supply of gas may pass through the other parts, as hereinbefore described.

Figs. 15 and 16 are illustrative of an arrangement by which the fulcrum $f$ is brought between the spring $h$ and the burner $a$; but this arrangement is found by experiment not to be so effective as those first before described.

In each of the forms illustrated in the drawings the burner is supported by a ball-and-socket joint, through which the gas is supplied, and which joint is itself yieldingly supported or carried at the end of a lever which forms part of the supply-pipe. Hence vertical movements of the outer end of the lever have no tendency to impart a lateral or swinging movement to the burner, as would be the case if the ball-and-socket connection were at the pivotal point of the lever instead of at the end thereof.

Such being the nature and object of our invention, what we claim is—

1. A burner-support comprising a pivoted section of supply-pipe, a burner pivotally connected with and supported by the outer end thereof, and means for yieldingly holding the pivoted section in a substantially horizontal position.

2. A burner-support comprising a pivoted section of supply-pipe, a burner supported by the outer end thereof, the connection consisting of a ball-and-socket joint, and means for yieldingly supporting the said pivoted section in a substantially horizontal position.

3. A burner-support comprising in its construction the supply-pipe $d$ pivotally connected with a fixed section of supply-pipe, the pipe $b$ supporting the burner and depending from the free end of the pipe $d$, the joint between the pipes $d$ and $b$ being of a ball-and-socket type, and spring mechanism for normally retaining the pipe $d$ in a substantially horizontal position.

4. In supports for incandescent gas-burners, the combination with the main supply-pipe, of the horizontal pipe pivotally connected therewith, the vertically-disposed pipe $b$ connected with said horizontal pipe and carrying the burner, the ball-and-socket joint $c$ in said pipe $b$, and the spring supporting the burner and said horizontal and vertical pipes.

5. In supports for incandescent gas-burners, the combination with the main supply-pipe, of the horizontal pipe pivotally connected therewith, the vertically-disposed pipe $b$ connected with said horizontal pipe and carrying the burner, the ball-and-socket joint $c$ in said pipe $b$, and the spring $h^3$ arranged underneath the burner and supporting the same and the horizontal and vertical pipes.

WILLIAM RICHARD CLAY.
BEN WALMSLEY.

Witnesses:
SAMUEL HEY,
JOHN WHITEHEAD.